United States Patent [19]

Peek

[11] Patent Number: 4,571,136

[45] Date of Patent: Feb. 18, 1986

[54] PLASTIC PUSH-ON FASTENER

[75] Inventor: Brian R. Peek, Steger, Ill.

[73] Assignee: Illinois Tool Works Inc., Chicago, Ill.

[21] Appl. No.: 579,054

[22] Filed: Feb. 10, 1984

[51] Int. Cl.[4] ............................................. F16B 37/16
[52] U.S. Cl. ................................... 411/437; 411/510;
411/512; 24/104; 24/662
[58] Field of Search .................. 411/16, 17, 33, 21,
411/15, 62, 371–374, 369, 392, 429, 427, 182,
436, 437, 431, 438, 512, 508–510, 516–519, 521,
908; 24/104, 106, 108, 90 R, 580–585, 459, 522,
662, 671, 297; 248/74.3

[56] References Cited

U.S. PATENT DOCUMENTS

| | | | |
|---|---|---|---|
| 1,168,770 | 1/1916 | Wagner | 411/57 |
| 3,545,708 | 12/1970 | Gross | 248/74.3 |
| 4,408,372 | 10/1983 | Kimura et al. | 411/61 |
| 4,435,111 | 3/1984 | Mizusawa | 411/437 |
| 4,461,059 | 7/1984 | Bury | 248/74.3 |

FOREIGN PATENT DOCUMENTS

| | | | |
|---|---|---|---|
| 862436 | 2/1971 | Canada | 411/437 |
| 912009 | 4/1946 | France | 411/437 |

Primary Examiner—Kenneth J. Dorner
Assistant Examiner—Neill Wilson
Attorney, Agent, or Firm—J. P. O'Brien; T. W. Buckman

[57] ABSTRACT

A one-piece plastic fastener is disclosed as being designed to be pushed on a threaded stud. The fastener has a head portion and a cylindrical body portion. The cylindrical body portion is formed with a pair of diametrically opposed rib sections extending the length of the body portion with the rib sections having equally spaced arcuate segments. In the interior of the cylindrical body portion a resilient wing member is integrally formed inwardly of the arcuate segment. A pair of longitudinally extending narrow ridges are formed on the interior of the cylindrical body with a thickness selected to cause the resilient wing members to be brought into threaded engagement with the threaded stud as the fastener is pushed onto the stud.

13 Claims, 9 Drawing Figures

ND NUMBER: 4,571,136

PLASTIC PUSH-ON FASTENER

BACKGROUND OF THE INVENTION

This invention relates to a push-on type fastener that can be quickly installed on a threaded stud but requires unscrewing to remove the fastener.

There is a need for a fastener in the assembly of products that can be quickly installed by a person and thereafter have a high retention force. It is also desirable that the push-on fastener be inexpensive to manufacture since a large number of them are used in the assembly process.

This invention is directed to a plastic fastener that may be molded in a conventional manner to provide a very inexpensive product. The push-on type fastener should also be quick to install without the use of tools and have high retention forces to avoid any accidental removal. It is preferable that the fastener be removed by unscrewing so that the fastener may be re-used.

SUMMARY OF THE INVENTION

This invention is directed to a one-piece plastic fastener adapted for mounting on a threaded stud and comprises a head portion and cylindrical body portion. The cylindrical body portion has at least one rib section formed by a series of spaced-apart arcuate segments and has retaining means formed internally for ratcheting over the threads of the threaded stud upon the cylindrical body portion being pressed onto the stud. The retaining means includes a resilient wing member integrally formed on the plurality of arcuate segments in a manner that causes the tips of the wing members to engage the threads of the threaded fastener.

DESCRIPTION OF DRAWINGS

For a better understanding of this invention, reference may be made to the accompanying drawings, in which.

DESCRIPTION OF FIRST EMBODIMENT

Figure 3:
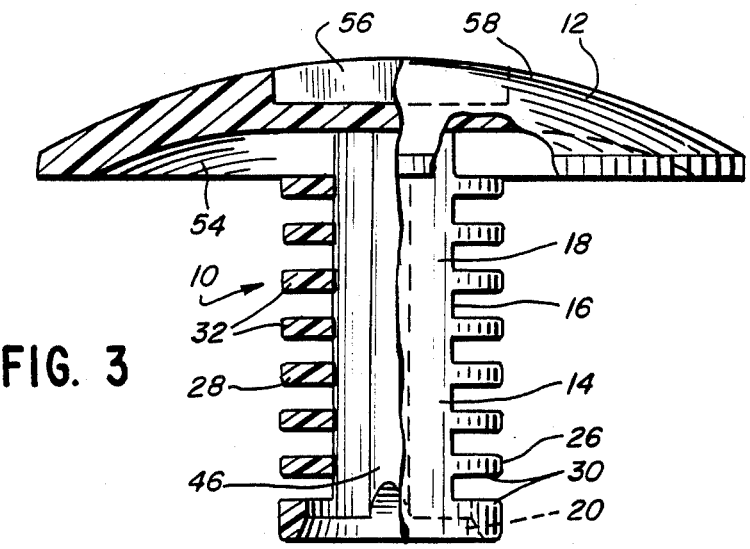
FIG. 3 is a front elevational view of the push-on type fastener shown in FIG. 1 with the left side shown in cross section.

There is illustrated in FIG. 3, a one-piece fastener generally designated by the reference numeral 10. Fastener 10 has a head portion 12 and a shank portion 14.

The shank portion 14 has a generally cylindrical tubular body 16 with an axial bore 18 extending between its open end 20 and head portion 12. The cylindrical body 16 has two diametrically opposed axially extending arcuate members 22 and 24 which are interconnected by a pair of diametrically opposed rib sections 26 and 28.

The rib sections 26 and 28 are identical in construction, consisting of a series of generally arcuate segments 30 and 32, respectively. The arcuate segments 30 and 32 extend between the head portion 12 and the open end 20 of body 16.

A retaining means 34 is provided internally of cylindrical body 16 for securing the fastener 10 on a stud 36. As will be explained hereinafter, the retaining means 34 includes a means for ratcheting over the threads of stud 36 and thereafter to hold the fastener 10 on stud 36 by virtue of a threaded engagement with its threads 38.

Retaining means 34 includes radially inward extending resilient wing members 40 and 42 which are integrally formed on each of the arcuate segments 30 and 32, respectively. Retaining means 34 further includes axially extending ridges 44 and 46 which are integrally formed on the inner surface of arcuate members 22 and 24.

Figure 1:
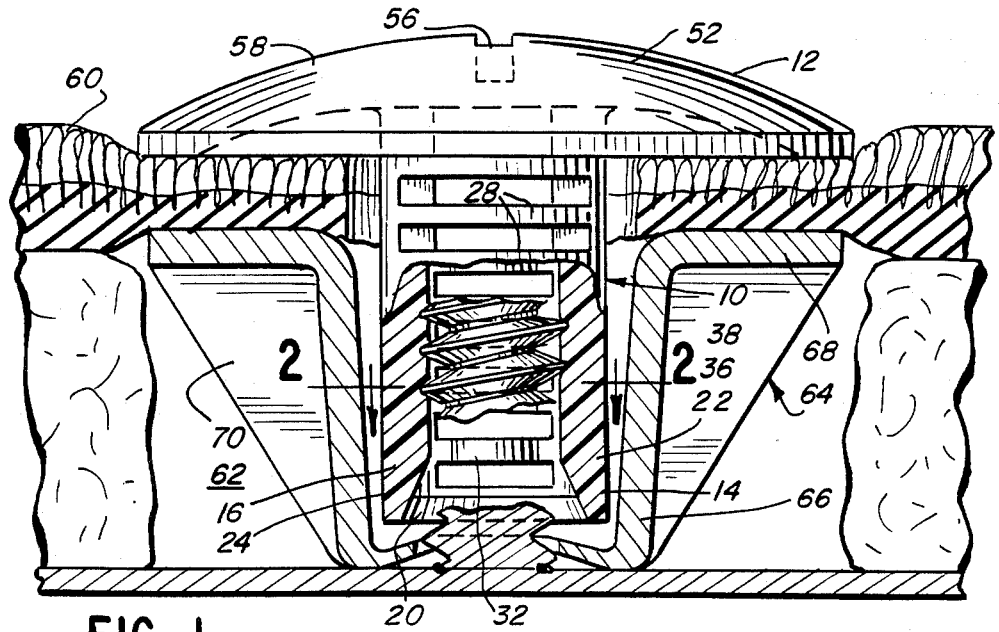
FIG. 1 is a sectional view of a push-on type fastener embodying the principles of this invention as shown in threaded engagement with a threaded stud, and illustrating the fastener's use as a carpet's retention device.
Figure 2:
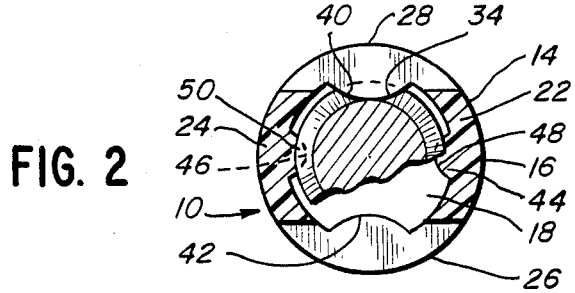
FIG. 2 is a cross-sectional view of FIG. 1 taken along the lines 2—2 and looking in the direction of the arrows.

The resilient wing members 40 and 42 are equally spaced apart a distance calculated to provide threaded engagement with the threads 38 of stud 36 as illustrated in FIGS. 1 and 2. Due to the resilient nature of each of the arcuate segments 30 and 32 and their associated wing members 40 and 42, respectively, the wing members 40 and 42 are caused to ratchet over the threads 38 of stud 36 as the fastener 10 is pushed inwardly onto the stud 36. This ratcheting action causes the wing members 40 and 42 to be brought into threaded engagement with the threads 38.

The resilient wing members 40 and 42 are depicted as being in a common plane. It will be appreciated that resilient wing members 40 and 42 could be staggered relative to each other in an axial direction.

Axially extending ridges 44 and 46 are formed as solid narrow strips when the fastener 10 is molded of a plastic material such as nylon. The first application of a fastener 10 onto a threaded stud 36 causes the ridges 44 and 46 to slidingly engage the threads 38. Thereafter the fastener 10 is turned to unscrew it from threaded engagement with wing members 40 and 42. This unscrewing action causes the threads 38 to cut self-tap thread surfaces 48 and 50 along ridges 44 and 46, respectively.

The head portion 12 extends in a normal relation to shank portion 14. It has a dome-shaped body 52. The cylindrical body is integrally connected at the center of its concave inner surface 54. There is provided an elongated slot 56 at the center of the convex outer surface 58 of domeshaped body 52 for receiving a tool such as a screwdriver head.

It will be appreciated that other configurations could be used for the head portion 12 without changing the character or use of fastener 10.

To illustrate one practical use of the push-on fastener 10 it is shown in FIG. 1 securing a piece of carpeting 60 in an automobile storage area that has a cube-shaped recess 62 with an upstanding threaded stud 36 mounted at its center.

The carpet 60 is retained between the head 12 of fastener 10 and a cup-shaped support member 64. The cup-shaped support member 64 has a tubular body portion 66 surrounding the shank portion 14 of fastener 10 and an integrally formed annular collar 68. Four triangular-shaped support members extend between the annular collar 68 and the bottom of cylinder 66 at four quadrants to support the annular collar 68.

When the fastener 10 is pushed onto the threaded stud 36 the concave inner surface 54 of head 12 engages the carpet 60 and compresses it against the annular collar 68 of support member 64.

To remove the carpet 60 it is necessary to unscrew the fastener 10 off the threaded stud 36. It will be appreciated that the fastener 10 may be very quickly secured onto threaded stud 36 to hold the carpet 60 in place.

DESCRIPTION OF SECOND EMBODIMENT

Figure 4:
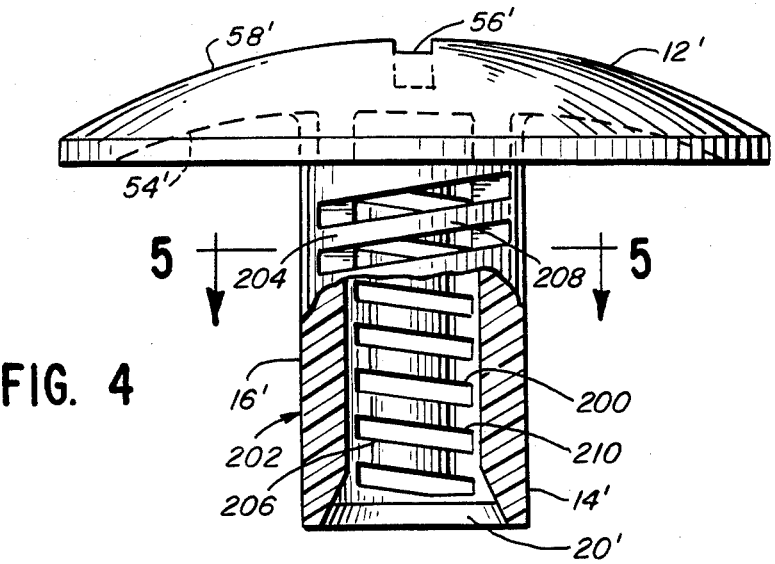
FIG. 4 is a front elevational view of the second embodiment of this invention with the bottom portion of the fastener depicted in cross section.
Figure 5:
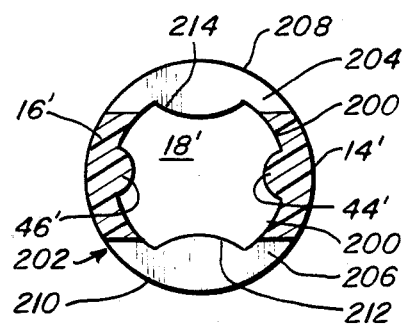
FIG. 5 is a cross-sectional view taken along lines 5—5 of FIG. 4 and looking in the direction of the arrows.
Figure 6:
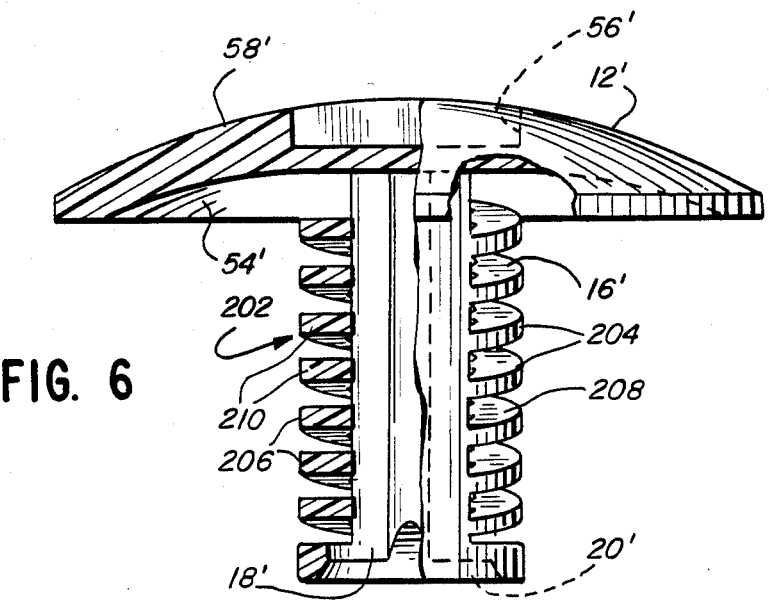
FIG. 6 is a front elevational view taken from the right side of FIG. 4 with the left portion being shown in section.

The second embodiment is illustrated in FIGS. 4, 5 and 6. Like parts to the first embodiment are designated by using the same numeral with a prime designation.

The major difference of the second embodiment is that the retaining means 200 is designed to be dependent on the thread pitch of the threaded stud 36' in order to make it easier to remove the fastener 202 from the stud.

The rib sections 204 and 206, respectively, are formed with their arcuate segments 208 and 210 to be slanted to match the thread pitch of threads 38' of stud 36'.

The resilient wing members 212 and 214 which are integrally formed on each arcuate segment 208 and 210, respectively, are slanted in conformance with the thread pitch to provide for higher pulloff forces and easier unscrewing of the fastener 202.

Other than the above noted changes to the retaining means 200, the second embodiment is identical in construction to the first embodiment.

DESCRIPTION OF THIRD EMBODIMENT

Figure 7:
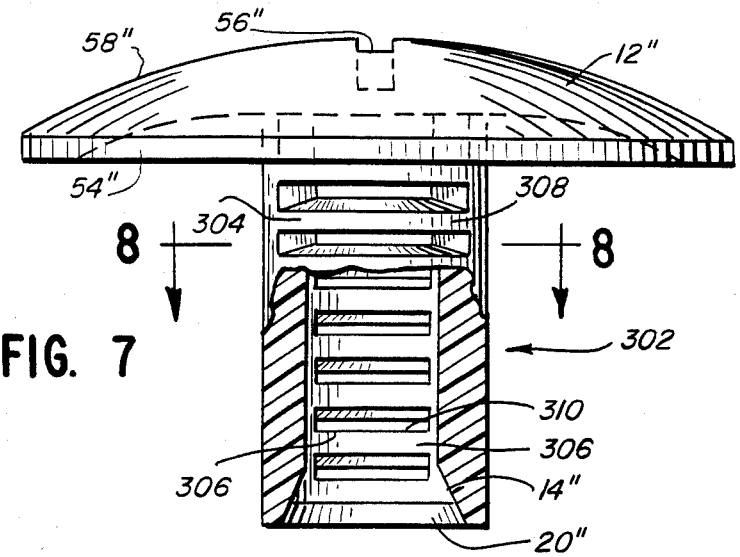
FIG. 7 is a front elevational view depicting the third embodiment of this invention with the bottom portion shown in section.
Figure 8:
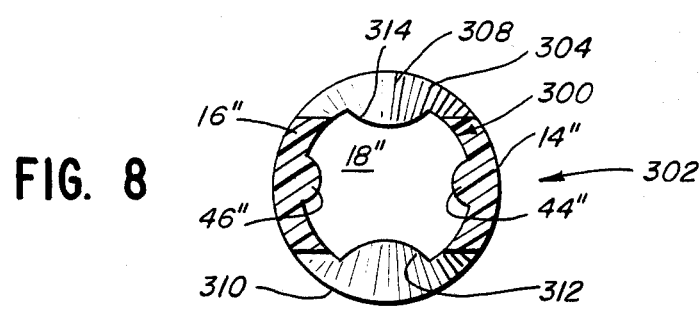
FIG. 8 is a cross-sectional view taken along the lines 8—8 of FIG. 7 and looking in the direction of the arrows.
Figure 9:
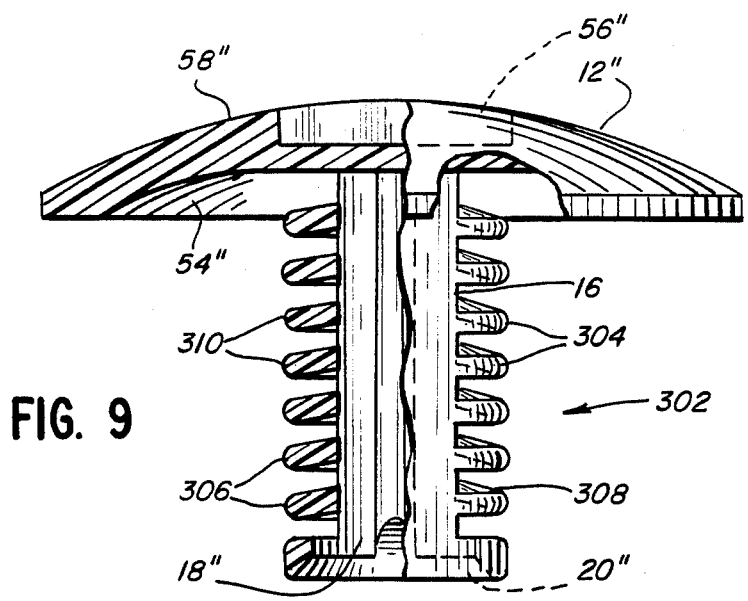
FIG. 9 is a side elevational view taken from the right side of FIG. 7 with the left portion of FIG. 9 being shown in section.

There is illustrated in FIGS. 7, 8 and 9 the third embodiment of this invention. Like parts of the third embodiment to that shown of the first embodiment are designated by a double prime reference.

The third embodiment is designed with a retaining means 300 to provide lower insertion forces onto a threaded stud and higher pull-off forces.

The fastener 302 in FIGS. 7, 8 and 9 is constructed with a pair of opposing rib sections 304 and 306, respectively, which are formed with equally spaced arcuate segments 308 and 310 which are each slanted downwardly towards the open end 20'.

Each of the resilient wing members 312 and 314 which are integrally formed on the internal surfaces of arcuate segments 308 and 310, respectively, are formed on the same plane to cause the wing members 312 and 314 to be radially directed in an inclined direction towards the head portion 12'. It will be appreciated by having the wing members 312 and 314 inclined in this direction will reduce the insertion force required for installing the fastener 302 onto a stud 36'' and increase the pull-off force of the fastener.

I claim:

1. A one-piece plastic fastener fastener adapted for mounting on a threaded stud comprising a head portion and a generally axially extending cylindrical body portion having at least one cylindrically extending rib section formed by a series of spaced apart arcuate segments, each of said arcuate segments having the opposite ends integrally formed with an axially extending solid cylindrical wall segment and having the length of each arcuate segment between said opposite ends free to flex, said cylindrical body portion having retaining means formed internally thereof for ratcheting over the threads of said threaded stud upon said cylindrical body portion being pressed onto said stud and thereafter threadedly engaging said threads, said retaining means including a resilient wing member integrally formed on a plurality of said arcuate segments and extending inwardly of said body portion such that at least the tips of said wing members engage the threads of said threaded fastener.

2. A one-piece plastic fasteners as defined in claim 1, wherein said retaining means further comprises a pair of spaced apart narrow elongated ridges formed integrally on the interior of said cylindrical body portion and extending in a generally axial direction, the thickness of said ridges being selected to cause said wing members to be brought into engagement with the threads of said threaded stud as said fastener is pushed onto said threaded stud.

3. A one-piece plastic fastener as defined in claim 1, wherein said resilient wing members are formed at an angle that corresponds to a particular thread pitch of a threaded fastener to permit easier removal when unscrewing.

4. A one-piece plastic fastener as defined in claim 1, wherein said resilient wing members are formed with their free ends inclined towards said head to lower the insertion force required to ratchet said retaining means over the threads of said threaded stud.

5. A one-piece plastic fastener as defined in claim 1, wherein said arcuate segments are equally spaced apart and wherein one of said resilient wing members is formed on each of said arcuate segments.

6. A one-piece plastic fastener as defined in claim 1, wherein said at least one rib section comprises a pair of diametrically opposed rib sections and said retaining means includes said resilient wing members formed on each of said arcuate segments.

7. A one-piece plastic fastener as defined in claim 6, wherein each of said arcuate segments on one of said diametrically opposed rib sections lie in a common plane with one of said arcuate segments of the other of said diametrically opposed rib sections.

8. A one-piece plastic fastener adapted for mounting on a threaded stud comprising a head and a generally axially extending cylindrical body portion having a pair of diametrically opposed rib sections, each of said rib sections formed by a series of spaced apart arcuate segments, each of said arcute segments having the opposite ends integrally formed with an axially extending solid cylindrical wall segment and having the length of each arcuate segment between said opposite ends free to flex, said cylindrical body portion having retaining means formed internally thereof for ratcheting over the threads of said threaded stud upon said fastener being pressed onto said stud and thereafter threadedly engages said threads, said retaining means including a resilient wing member integrally formed on a plurality of said arcuate segments of both rib sections and extending inwardly of said body portion such that the tips of said wing members engage the threads of said threaded fastener.

9. A one-piece plastic fastener as defined in claim 8, wherein said retaining means further comprises a pair of diametrically opposed narrow elongated ridges formed integrally on the interior of said cylindrical body portion in a general axial direction, the thickness of said ridges being selected to cause said wing members to be brought into engagement with the threads of said threaded stud as the fastener is pushed onto said threaded stud.

10. A one-piece plastic fastener as defined in claim 8, wherein said resilient wing members are formed at an angle corresponding to a particular thread pitch of a threaded fastener to permit easier removal when unscrewing.

11. A one-piece plastic fastener as defined in claim 8, wherein said resilient wings are formed with their free ends inclined toward said head to lower the insertion force required to ratchet said retaining means over the threads of said threaded stud.

12. A one-piece plastic fastener as defined in claim 8, wherein said arcuate segments are equally spaced apart and wherein one of said resilient wing members is formed on each of said arcuate segments.

13. A one-piece plastic fastener as defined in claim 8, wherein each of said arcuate segments on one of said diametrically opposed rib sections lie in a common plane with one of said arcuate segments of the other of said diametrically opposed rib sections.

* * * * *